United States Patent
Baudel

(10) Patent No.: US 8,495,093 B2
(45) Date of Patent: Jul. 23, 2013

(54) MULTIWAY TRIE DATA STRUCTURE THAT DYNAMICALLY ADJUSTS NODE SIZES IN A MANNER THAT REDUCES MEMORY FOOTPRINT AND IMPROVES ACCESS SPEED

(75) Inventor: Thomas Baudel, Gentilly (FR)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 12/876,468

(22) Filed: Sep. 7, 2010

(65) Prior Publication Data

US 2012/0047181 A1    Feb. 23, 2012

(30) Foreign Application Priority Data

Aug. 18, 2010   (EP) ..................................... 10305896

(51) Int. Cl.
*G06F 17/30* (2006.01)
(52) U.S. Cl.
USPC .......................................................... 707/790
(58) Field of Classification Search
USPC .................. 707/790–793, 796–797, 802–804
See application file for complete search history.

(56) References Cited

U.S. PATENT DOCUMENTS

| | | | |
|---|---|---|---|
| 6,735,595 B2* | 5/2004 | Gobeille et al. | ........................ 1/1 |
| 2006/0067325 A1* | 3/2006 | Kounavis et al. | ........... 370/395.4 |
| 2008/0133446 A1 | 6/2008 | Dubnicki et al. | |
| 2010/0199066 A1* | 8/2010 | Artan et al. | .................... 711/216 |

* cited by examiner

*Primary Examiner* — Thu-Nguyet Le
(74) *Attorney, Agent, or Firm* — Robert A. Voigt, Jr.; Winstead, P.C.

(57) ABSTRACT

A method, system and computer program product for dynamically adjusting node sizes in a multiway trie data structure. Upon inserting a key/value pair in a node in a multiway trie data structure that causes the number of entries in the multiway trie data structure to exceed a threshold, a splitting method is implemented. The splitting method involves doubling the width of the node in the multiway trie data structure thereby resizing the node in a resized multiway trie data structure. Furthermore, a sub-node of the original node may be split into two sections and stored in two child level nodes of the resized node under certain circumstances. Hence, only the original node and its direct successors are resized. Such a data structure outperforms hash tables by taking advantage of patterns found in the key distribution to optimize both storage requirements and access speed.

24 Claims, 6 Drawing Sheets

MULTIWAY TRIE DATA STRUCTURE THAT DYNAMICALLY ADJUSTS NODE SIZES IN A MANNER THAT REDUCES MEMORY FOOTPRINT AND IMPROVES ACCESS SPEED

CROSS-REFERENCE TO RELATED APPLICATIONS

This application claims priority from European Patent Application No. EP10305896.2, filed on Aug. 18, 2010, the contents of which are incorporated herein by reference.

TECHNICAL FIELD

The present invention relates to data structures, and more particularly to a multiway trie data structure that dynamically adjusts node sizes in a manner that reduces the memory footprint and improves access speed.

BACKGROUND

A data structure is a particular way of storing and organizing data in a computer so that it can be used efficiently. Data structures are used in almost every program or software system. There are many different types of data structures, such as hash tables, binary search trees, skip lists, ternary search trees, etc. In particular, a hash table is a data structure that uses a hash function to map identifying values, known as keys (e.g., a person's name) to their associated values (e.g., their telephone number). Currently, in many situations, hash tables turn out to be more efficient than search trees or other table lookup structures. For this reason, they are widely used in many kinds of computer software, particularly for associative arrays, database indexing, caches and sets.

While hash tables are currently more efficient than search trees or other table lookup structures, the memory footprint (referring to the amount of main memory that a program uses or references while running) and access speed (referring to the lookup rate) could be improved. Hence, the functionality of hash tables should be maintained while reducing the memory footprint and improving access speed.

BRIEF SUMMARY

In one embodiment of the present invention, a method for dynamically adjusting node sizes in a multiway trie data structure comprises doubling a width of a node in a multiway trie data structure, by a processor, to be resized in a resized multiway trie data structure in response to a key/value pair being inserted in a slot of the node in the multiway trie data structure. The insertion of the key/value pair causes a number of entries in the multiway trie data structure to exceed a threshold. The method further comprises expanding a depth of the node in the multiway trie data structure, by the processor, to be resized in the resized multiway trie data structure with a depth equal to log2 (width of the resized node).

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
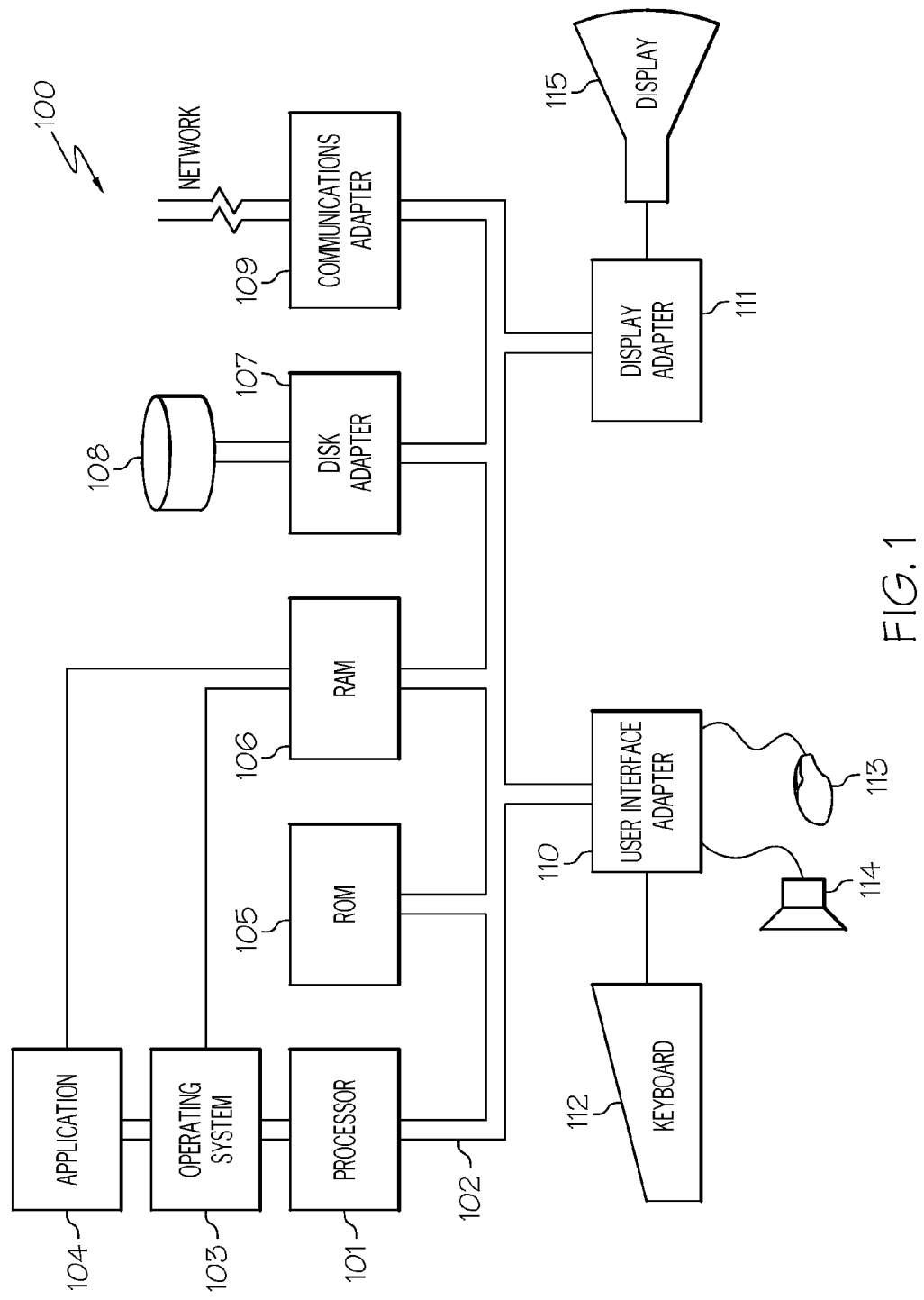
FIG. 1 is a configuration of a computer system configured in accordance with an embodiment of the present invention.

Referring now to the Figures in detail, FIG. 1 illustrates an embodiment of a hardware configuration of a computer system 100 which is representative of a hardware environment for practicing the present invention. Referring to FIG. 1, computer system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a component for reducing memory footprint and improving access speed in a multiway trie data structure with the functionality of a hash table as discussed further below in association with FIGS. 2-7.

Referring again to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for reducing memory footprint and improving access speed in a multiway trie data structure with the functionality of a hash table as discussed further below in association with FIGS. 2-7, may reside in disk unit 108 or in application 104.

Computer system 100 may further include a communications adapter 109 coupled to bus 102. Communications adapter 109 may interconnect bus 102 with an outside network (not shown) thereby allowing computer system 100 to communicate with other similar devices.

I/O devices may also be connected to computer system 100 via a user interface adapter 110 and a display adapter 111. Keyboard 112, mouse 113 and speaker 114 may all be interconnected to bus 102 through user interface adapter 110. Data may be inputted to computer system 100 through any of these devices. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium includes an electronic, magnetic, optical, electromagnetic or semiconductor device that is suitable for storage. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, while hash tables are currently more efficient than search trees or other table lookup structures, the memory footprint (referring to the amount of main memory that a program uses or references while running) and access speed (referring to the lookup rate) could be improved. Hence, the functionality of hash tables should be maintained while reducing the memory footprint and improving access speed.

Figure 2:
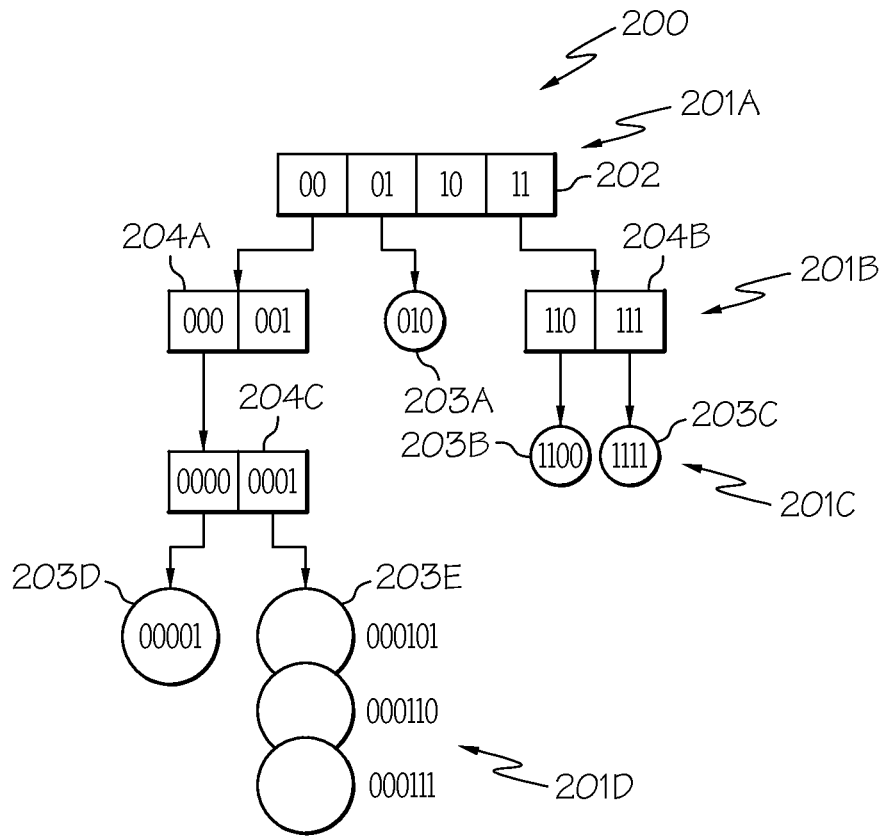
FIG. 2 illustrates a multiway trie data structure in accordance with an embodiment of the present invention.
Figure 3:
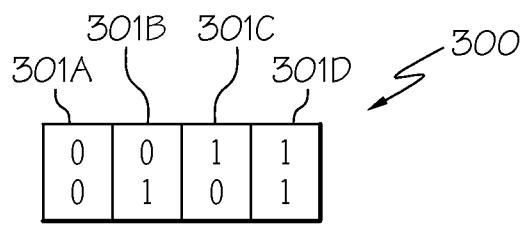
FIG. 3 illustrates the concept of slots/entries in a multiway trie data structure in accordance with an embodiment of the present invention.
Figure 4:
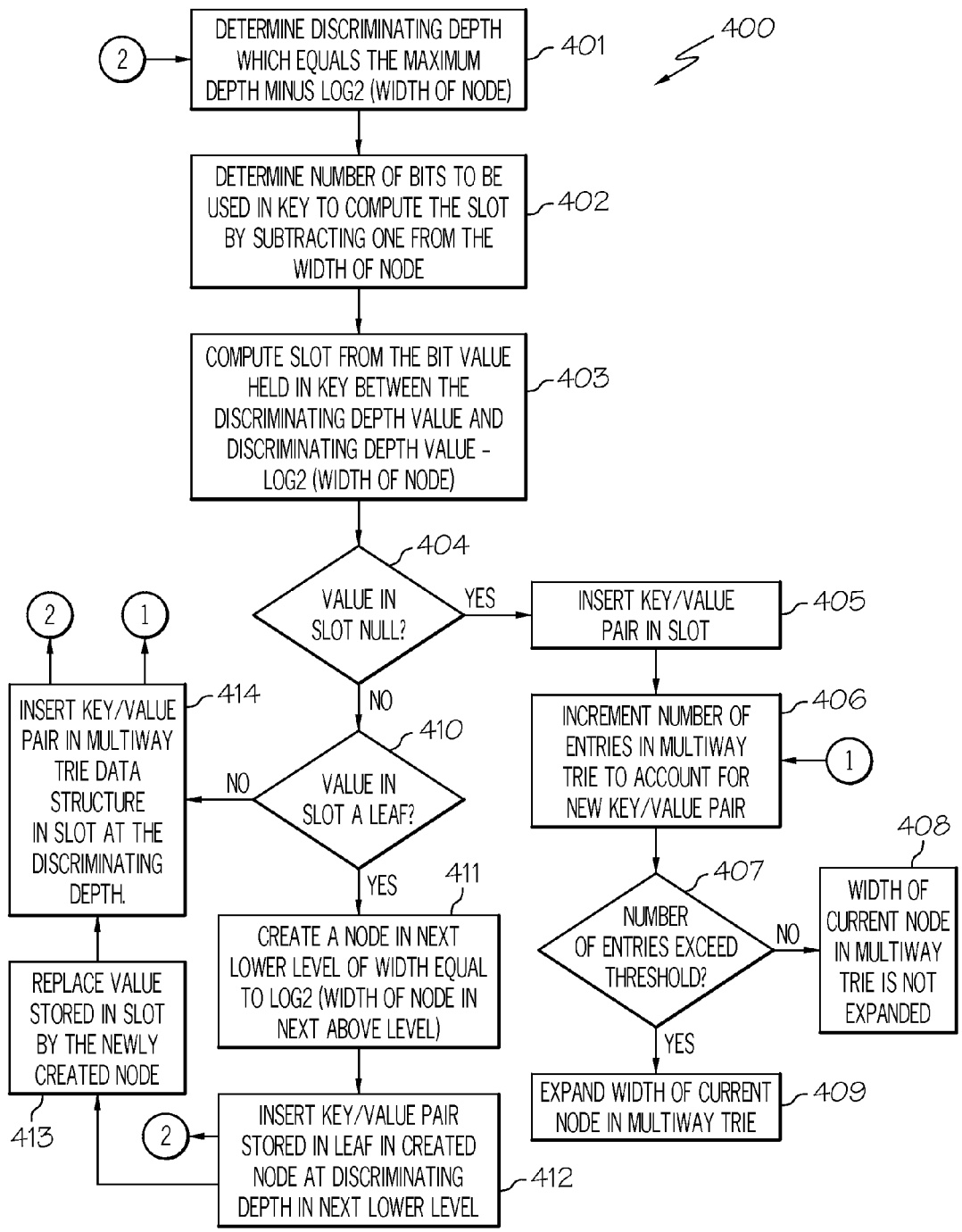
FIG. 4 is a flowchart of a method for efficiently inserting a key/value pair in a multiway trie data structure in accordance with an embodiment of the present invention.
Figure 5:
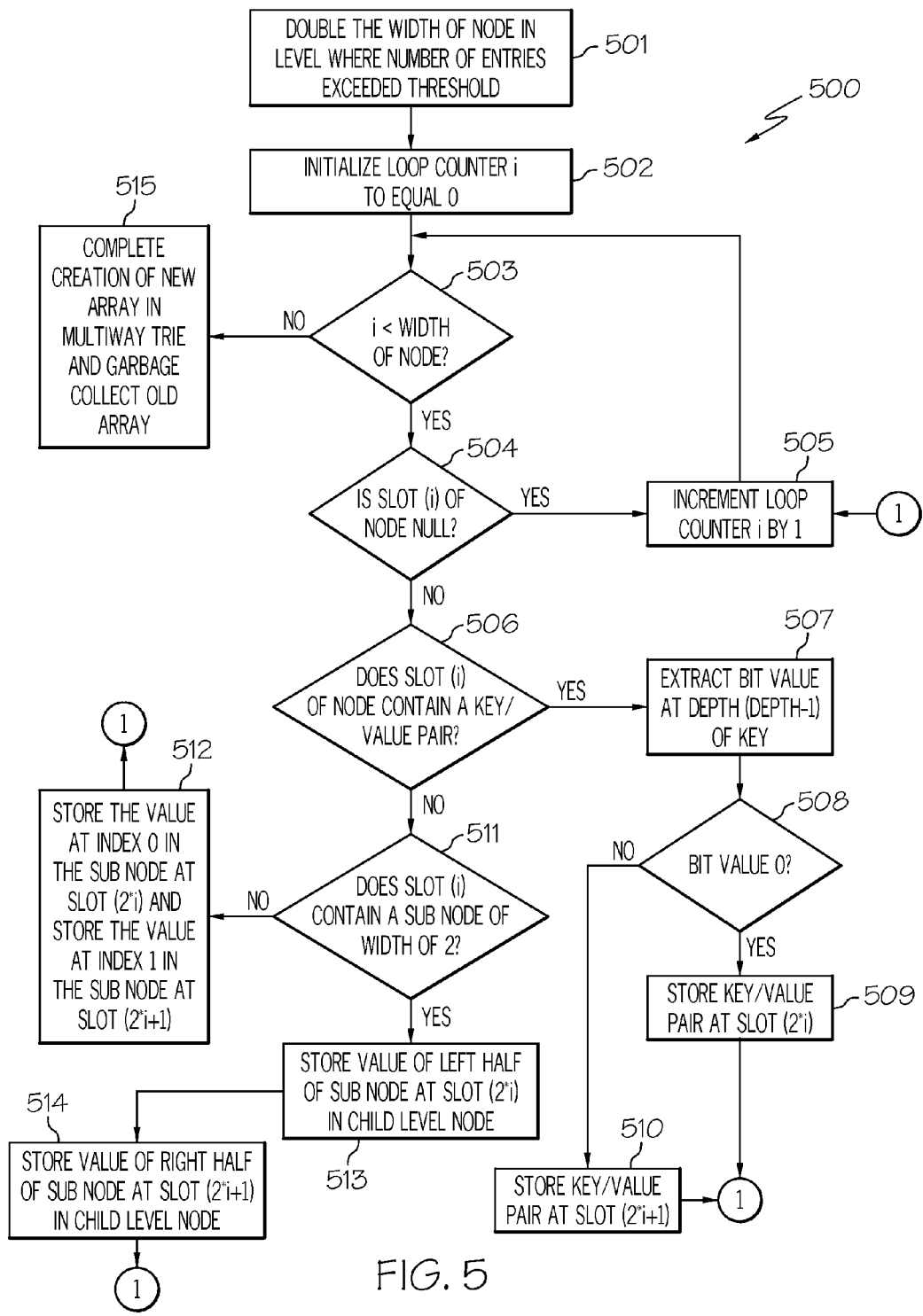
FIG. 5 is a flowchart of a method for adaptively resizing a node in accordance with an embodiment of the present invention.
Figure 6:
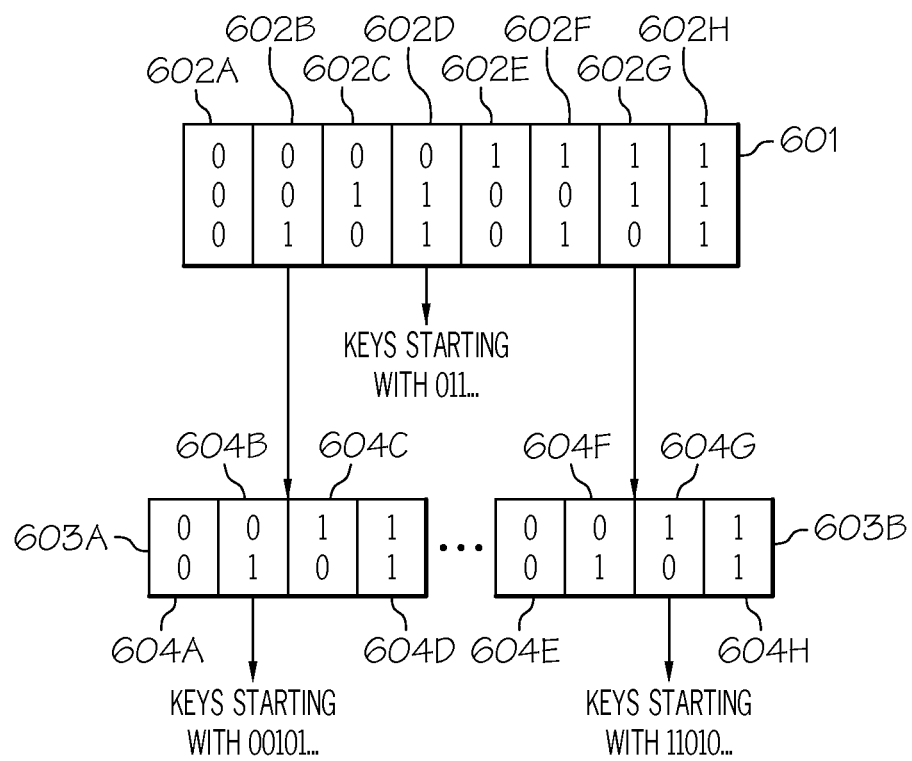
FIG. 6 illustrates the width and depth of the entries in two node levels of a sample multiway trie data structure prior to performing the "splitting method" in accordance with an embodiment of the present invention.
Figure 7:
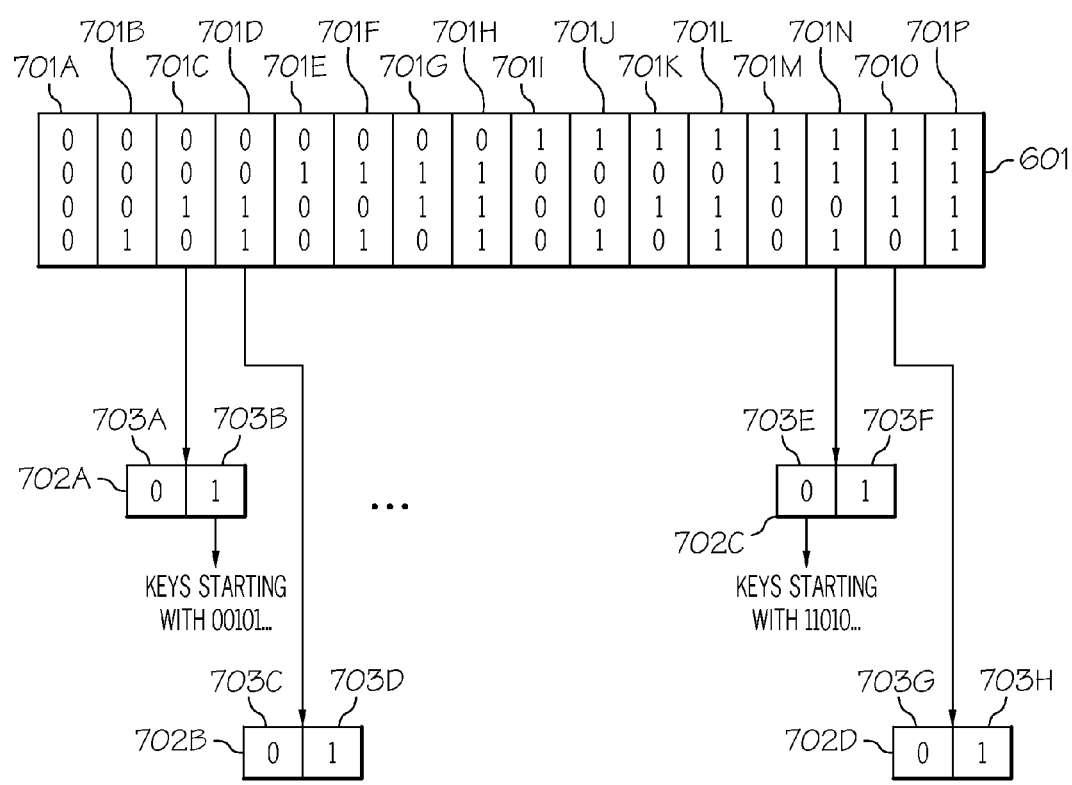
FIG. 7 illustrates the new widths and depths of the entries in the same two node levels after performing the splitting method of the present invention in accordance with an embodiment of the present invention.

The principles of the present invention provide a multiway trie data structure (can also be referred to as a "multiway digital tree" or a "multiway prefix tree") that provides the functionality of a hash table while reducing the memory footprint and improving access speed as discussed below in connection with FIGS. 2-8. FIG. 2 illustrates a multiway trie data structure. FIG. 3 illustrates the concept of slots/entries in a node of a multiway trie data structure. FIG. 4 is a flowchart of a method for efficiently inserting a key/value pair in the multiway trie data structure. FIG. 5 is a flowchart of a method of the sub-steps of adaptively resizing a node in the multiway trie data structure. FIG. 6 illustrates the width and depth of the entries in two node levels of a sample multiway trie data structure prior to performing the "splitting method" of the present invention. FIG. 7 illustrates the new widths and depths of the entries in the same two node levels after performing the splitting method of the present invention.

A brief discussion of a multiway trie data structure is deemed appropriate in order to understand the principles of the present invention. Referring to FIG. 2, FIG. 2 illustrates a multiway trie data structure 200 for practicing the principles of the present invention. Multiway trie data structure 200 is an ordered tree data structure with a set of linked nodes used to store an associative array of key-value pairs. In one embodiment, the keys may be integer-valued keys. In another embodiment, the keys may be textual strings. Multiway trie data structure 200 may include multiple levels of nodes, such as levels 201A-201D, where level 201A is the top level, level 201B is the second level and so forth. Levels 201A-D may collectively or individually be referred to as levels 201 or level 201, respectively.

Each level may include one or more nodes. For example, level 201A includes node 202. Level 201B includes nodes 203A, 204A and 204B. Level 201C includes nodes 203B, 203C, 204C. Furthermore, level 201D includes nodes 203D, 203E. A more detail description of these nodes is provided below.

Top level 201A may include the topmost node in multiway trie data structure 200 known as the root node 202. Each node (besides the leaf nodes as discussed below) in multiway trie data structure 200 includes some number "children" or "sub-nodes" for each node. For example, node 204B has children identified as nodes 203B, 203C.

Nodes that do not have any children are called "leaf nodes" or "terminal nodes" such as nodes 203A-203E. That is, leaf nodes are located at the end of each branch of multiway trie data structure 200. Leaf nodes 203A-203E may collectively or individually be referred to as leaf nodes 203 or leaf node 203, respectively. Leaf nodes 203 are shown in FIG. 2 as circles; whereas, non-leaf nodes are shown in FIGS. 2 as squares containing a number of entries that is a power of 2 as discussed further below. In one embodiment, leaf nodes 203 store a list of key/value pairs (e.g., leaf node 203E), a single key/value pair (e.g., leaf nodes 203A, 203B, 203C and 203D) or a single key and an array of values, the keys for the consecutive values being deduced by adding the value's index in the array to the initial single key. In one embodiment, the last leaf 203 in multiway trie data structure 200 (e.g., leaf 203E) stores a list of key/value pairs.

Nodes that are between root node 202 and leaf nodes 203 are referred to herein as the "intermediary nodes" 204A-204C which have a child node. Intermediary nodes 204A-204C may collectively or individually be referred to as intermediary nodes 204 or intermediary node 204, respectively.

Each top level and intermediary node (i.e., non-leaf nodes) (e.g., nodes 202, 204) includes "slots" or "entries" which are used to hold distinct keys. The number of slots is called the "arity," which represents the width of the node. For the data structure to be consistent, the width of each non-leaf node in multiway trie data structure 200 is a power of 2. A consequence of having the non-leaf nodes 202, 204 have a width that is a power of 2 is that each non-leaf node 202, 204 is associated with a corresponding "depth" of a number of bits. The depth of non-leaf node 202, 204 corresponds to the number of bits that equals log2 (width of the node). For example, if node 202 has a width of 4 entries/slots, then the depth of each slot corresponds to log2(4) which corresponds to 2 bits. It is noted that not all of the slots, such as null slots, are depicted for non-leaf nodes 204 in FIG. 2 in order to not obscure the present invention in unnecessary detail. An illustration of slots or entries is provided in FIG. 3.

Referring to FIG. 3, FIG. 3 illustrates the slots/entries 301A-301D in a node 300 in accordance with an embodiment of the present invention. Slots 301A-301D may collectively or individually be referred to as slots 301 or slot 301, respectively. As further illustrated in FIG. 3, the depth of slots 301 corresponds to log2 (width of the node). In the case illustrated in FIG. 3, node 300 has a width of four slots/entries 301 thereby resulting in a depth of two for each slot 301. Slot 301A (or slot "0") is indicated by the binary values of 00. Slot 301B (or slot "1") is indicated by the binary values of 01. Slot 301C (or slot "2") is indicated by the binary values of 10. Slot 301D (or slot "3") is indicated by the binary values of 11.

Returning to FIG. 2, in the embodiment where a key corresponds to a string, FIG. 2 illustrates the storing of the strings "00001," "000101," "000110," "000111," "010," "1100," and "1111." As further illustrated in FIG. 2, the key/value pairs are stored in leaf nodes 203.

As discussed above, the principles of the present invention reduce the memory footprint and improve the access speed in a data structure with the functionality of a hash table by implementing an insertion method for inserting a key/value pair into the multiway trie data structure 200 as discussed below in connection with FIG. 4. While the following discusses the keys being integer values, it is noted that the principles of the present invention apply to keys being any sequence of bits and textual strings interpreted as bit sequences.

In one embodiment, the maximum depth of multiway trie data structure 200 (includes the depth of each node in the longest branch of multiway trie data structure 200) corresponds to the highest order bit of the highest key value stored in multiway trie data structure 200. As a result, if a higher key is stored in multiway trie data structure 200, then the root level node 202 is grown by an appropriate amount to accommodate for keys of higher values using the insertion method of FIG. 4.

FIG. 4 is a flowchart of a method 400 for efficiently inserting a key/value pair in multiway trie data structure 200 (FIG. 2) in accordance with an embodiment of the present invention.

Prior to discussing method 400, the following pseudo-code, directly translatable into a real language, such as C++ or Java™, is provided for ease of understanding of method 400.

```
400 function Node.insert(int key, Object value, int depth) {
401     depth=depth-log2(children.size);
402-403 int slot=(children.size-1)&(key>>depth);
404     if(children[slot] is null)
405         children[slot]=new Leaf(key, value);
        else {
406         if(children[slot] is a Leaf) {
407             Node n=new Node( );
408             n.insert(children[slot].key,
                    children[slot].value,depth);
409             children[slot]=n;
            }
410         children[slot].insert(key, value, depth);
        }
411     count=count+1;
412     if(children.size*children.size/16 < count)
413         split(depth);
}
```

To assist in understanding this pseudo-code, the following explanation is provided. The function Node.insert inserts a key/value pair in a Node at a depth given by the depth variable. At the top level, the value of the depth is equal to the maximum length of the keys in bits. This value is subtracted at each recursive call. A "node" is a data structure that has a count member that counts the total number of entries in the structure and its children, and a children member which is an array (whose size is a power of two) of slots, each pointing to child nodes or leafs. A "leaf" is a data structure that contains (in this illustration) a key/value pair.

Referring to FIG. 4, in conjunction with FIGS. 1-3, in step 401, a term referred to herein as the "discriminating depth," is determined which equals the maximum depth of multiway trie data structure 200 minus log2 (width of node). For example, suppose that the maximum depth corresponds to 32 for a 32 bit integer key stored in multiway trie data structure 200. If the width of the node is 16 entries, then log2(16) is equal to 4. As a result, the discriminating depth is equal to 32−4=28.

Alternatively, the discriminating depth may be expressed as the maximum depth of multiway trie data structure 200 minus the number of bits (n) in the equation $2^n$=width of node.

In the first iteration of method 400, the width of root node 202 is used in determining the discriminating depth in step 401 followed by using the width of the next lower level node in the subsequent iteration and so forth, if necessary.

In step 402, the number of bits to be used in a key to be inserted in multiway trie data structure 200 to compute the slot to be tested (discussed further below) is determined by subtracting one from the width of the node used in step 401. As an example, if the width of root node 202 is 16 entries, then the number of bits to be used is determined by subtracting 1 from 16 which equals 15, which corresponds to 1111 in binary notation. Since this corresponds to a length of 4 bits, then the first 4 bits of the keys are used in computing the slot or entry as discussed further below.

In step 403, the slot is computed from the bit value held in the key to be inserted in multiway trie data structure 200 between the discriminating depth value and (discriminating depth value−log2 (width of the node used in step 401)). The bit value is determined by an arithmetic shift of the key to the right by the total depth, followed by an arithmetic "and" with the mask computed at step 402. If the discriminating depth value is equal to 28 and the width of root node 202 is equal to 16 entries, then slot 301 is computed from the bit value held in the key between the 24th and 28th bits in the key.

In step 404, a determination is made as to whether the value in the slot to be tested is null. For example, if the value of the key to be inserted in multiway trie data structure 200 is five (101), then the value held in this key between the 24th and 28th bits would be 0. As a result, the value in slot "0," such as slot 301A, is tested to determine if the value stored in this slot is null.

If the value stored in the slot is null, then, in step 405, the key/value pair to be inserted in multiway trie data structure 200 is inserted in this slot as a leaf.

In step 406, the number of entries in multiway trie data structure 200 is incremented to account for the key/value pair inserted in step 405. In one embodiment, a counter, such as a counter implemented in software, is incremented to account for the newly added key/value pair in multiway trie data structure 200.

In step 407, a determination is made as to whether the number of entries ("count") in multiway trie data structure 200 exceeds a threshold. In one embodiment, the threshold is set to equal an integer multiple of the square root of the content size of multiway trie data structure 200. For example, the threshold may equal 4*square root(content size). Alternatively, the threshold may be computed by squaring the width of the node used in step 401 and divided by the integer multiple squared.

If the number of entries ("count") in multiway trie data structure 200 does not exceed the threshold, then, in step 408, the width of the current node is not expanded.

Alternatively, if the number of entries ("count") in multiway trie data structure 200 exceeds the threshold, then, in step 409, the width of the current node in multiway data structure 200 is expanded (doubled) as discussed below in connection with FIG. 5.

Returning to step 404 of method 400, if the value stored in the slot is not null, then, in step 410, a determination is made as to whether the value in the slot is a leaf. If the value in the slot is a leaf, then, in step 411, a new node structure is created at the next lower level (i.e., the next level below the node used in step 401) of width equal to log2 (width of the node used in step 401). As an example, if the width of the node used in step 401 was 16 (i.e., the node had 16 slots/entries), then the node is created at the next lower level of a width equal to 4 (i.e., the node created at the next lower level will have 4 slots/entries).

In step 412, the key/value pair stored in the leaf is inserted in the node created in step 411. Upon inserting the key/value pair formerly stored in the leaf in the node created in step 411, the insertion method is recursively called as described in step 401 and following, using the newly created node and the new current depth as context instead of the current node. In step 413, the value stored in the slot is replaced by the newly created node. That is, the value stored in the slot, which was formerly a leaf, is replaced by the node created in step 411.

Upon replacing the value stored in the slot with the newly created node, in step 413, the key/value pair to be inserted in multiway trie data structure 200 is inserted in a child node in this slot at the discriminating depth in step 414.

Upon inserting the key/value pair in the slot in step 414, the number of entries in multiway trie data structure 200 is incremented in step 406.

Furthermore, upon inserting the key/value pair in the slot in step 414, the insertion method is recursively called as described in step 401 and following, using the newly created node and the new current depth as context instead of the current node.

Returning to step 410 of method 400, if the value stored in the slot is not a leaf, then the key/value pair to be inserted in multiway trie data structure 200 is inserted in this slot at the discriminating depth in step 414.

Method 400 may include other and/or additional steps that, for clarity, are not depicted. While method 400 is depicted in a recursive manner for the sake of clarity, it is to be understood that it may be implemented without recursion using known derecursion methods.

As stated above, the method for expanding the width of a node in multiway trie data structure 200 is discussed below in connection with FIG. 5.

FIG. 5 is a flowchart of a method 500 for creating a new array in multiway trie data structure 200 (FIG. 2) using the "splitting method" in accordance with an embodiment of the present invention.

Prior to discussing method 500, the following pseudo-code, directly translatable into a real language, such as C++ or Java™, is provided for ease of understanding of method 500.

```
Function Node.split(int depth) {
501     Object a[ ]=new Object[children.size*2];
502     int i=0;
503     while(i<children.size) {
504         if(children[i] != null) {
506             if(children[i] is a Leaf) {
507                 int slot=(children[i].key>>(depth-1))&1;
508                 if(slot==0) a[2*i]=children[i];
509                 else a [2*i+1]=children[i];
511             } else if (children[i].children.size==2) {
512                 a[2*i]=children[i].children[0];
                    a [2*i+1]=children[i].children[1];
            } else {
513                 a[2*i]=new Node(children[i], 0,
children.size/2);
514                 a[2*i+1]=new Node(children[i], children.size/2
                            children.size);
            }
505         i=i+1;
        }
515     children=a;
}
```

Referring to FIG. 5, in conjunction with FIGS. 1-4, in step 501, the width of the node in the level whose additional entry (e.g., step 405) caused the content size of multiway trie data structure 200 to exceed the threshold (in step 407) is doubled. That is, the width of the node that had a key/value pair inserted in one of its slots/entries thereby causing the content size of multiway trie data structure 200 to exceed the threshold in step 407 is doubled.

For example, referring to FIG. 6, FIG. 6 illustrates node 601 (representing the node that caused the content size of multiway trie data structure 200 to exceed the threshold) with eight entries 602A-602H prior to doubling in size in accordance with an embodiment of the present invention. Slots/entries 602A-602H may collectively or individually be referred to as slots 602 or slot 602, respectively. As further illustrated in FIG. 6, the depth of slots 602 is equal to log2 (width of node). Since the width of node 601 is eight entries, the depth of slots 602 is equal to three bits.

FIG. 7 illustrates node 601 after doubling in size in accordance with an embodiment of the present invention. As illustrated in FIG. 7, node 601 now has sixteen slots/entries 701A-701P. Slots/entries 701A-701P may collectively or individually be referred to as slots 701 or slot 701, respectively. As further illustrated in FIG. 7, the depth of slots 701 is equal to log2 (width of node). Since the width of node 601 is now sixteen entries, the depth of slots 701 is equal to four bits.

Returning to FIG. 5, in conjunction with FIGS. 1-3 and 6-7, in step 502, the loop counter (identified by the small letter "i") is set equal to zero.

In step 503, a determination is made as to whether the loop counter is less than the width of the node before it was doubled in step 501.

If the loop counter is less than the width of the node, then, in step 504, a determination is made as to whether the value stored at slot 602 at (i) is null. For example, in the first iteration, the loop counter i is set equal to zero. Hence, a determination may be made as to whether the value stored at slot "0" 602A is null.

If slot 602 contains a null value, then, in step 505, the loop counter i is incremented by one. In one embodiment, a counter, such as a counter implemented in software, is incremented.

If, however, slot 602 does not contain a null value, then, in step 506, a determination is made as to whether slot 602 at i contains a key/value pair. If slot 602 contains a key/value pair, then, in step 507, the bit value at depth (depth-1) of the key is extracted, where the "depth" refers to the depth of slot 602 at (i).

In step 508, a determination is made as to whether the extracted value of the key is 0. If the extracted value of the key is 0, then, in step 509, the key/value pair is stored at the left part of the new array that corresponds to slot 701 at index (2*i).

Alternatively, if the extracted value of the key is not 0, then, in step 510, the key/value pair is stored at slot 701 at index (2*i+1) in the expanded array of children.

Upon storing the key/value pair in step 509 or step 510, the loop counter i is incremented by one in step 505.

Returning to step 506, if slot 602 at (i) does not contain a key/value pair, then, in step 511, a determination is made as to whether slot 602 at (i) contains a sub-node of width of two. For example, referring to FIG. 6, slot 602B contains a sub-node 603A with a width of four (slots 604A-604D). Similarly, slot 602G contains a sub-node 603B with a width of four (slots 604E-604H). There are no other slots 602 that contain a sub-node.

If slot 602 at (i) does contain a sub-node of the width of two, then, in step 512, the value at index 0 in the sub-node is stored at slot 701 at (2*i) and the value at index 1 in the sub-node is stored at slot 701 at (2*i+1). Upon storing these values in node 601 that was doubled in width in step 501, the loop counter i is incremented by one in step 505.

If, however, slot 602 at (i) does not contain a sub-node of the width of two, then, in step 513, the value of the left half of the sub-node is stored at the slot at (2*i) in the child level node in the new array. For example, referring to FIGS. 6 and 7, child level nodes 702A-702D are a result of being split from nodes 603A-603B, respectively. The left half of sub-node 603A (value of 01) is stored in slots 703A-703B of child level node 702A. Similarly, the left half of sub-node 603B (value of 01) is stored in slots 703E-F of child level node 702C.

In step 514, the value of the right half of the sub-node is stored at the slot at (2*i+1) in the child level node in the new array. For example, referring to FIGS. 6 and 7, the right half of sub-node 603A (value of 01) is stored in slots 703C-703D of child level node 702B. Similarly, the right half of sub-node 603B (value of 01) is stored in slots 703G-H of child level node 702D.

Upon splitting the number of entries in the sub-node, the loop counter i is incremented by one in step 505.

Returning to step 503 of method 500, if, however, the loop counter i is not less than the width of the node, then, in step 515, the creation of a new array in multiway trie data structure 200 is completed and the old array may be removed, such as via garbage collection.

As illustrated in method 500, only the node involved in the level whose additional entry caused the content size of multiway trie data structure 200 to exceed the threshold and its direct successors are resized without reordering the full hierarchy. As a result of dynamically expanding the width of a node to grow while avoiding having the tree become too deep, an amortize resize operation is O(square root(n)) instead of O(n), where O is used to describe how the size of the input data affects an algorithm's usage of computational resources, and where n refers to the number of entries in multiway trie data structure 200. Multiway trie data structure 200 implementing the methods described herein outperforms hash tables by taking advantage of patterns found in the key distribution (e.g., keys can be in a consecutive and bounded range) to optimize both storage requirements (reduction in memory footprint) and access speed (improvement in access speed).

Method 500 may include other and/or additional steps that, for clarity, are not depicted. Further, method 500 may be executed in a different order presented and that the order presented in the discussion of FIG. 5 is illustrative. Additionally, certain steps in method 500 may be executed in a substantially simultaneous manner or may be omitted.

In addition to the methods described above, another leaf compression method consists of storing key/value pairs that are close to being consecutive in a leaf including a first key and an array of values, the key for each value being deduced such as by adding the index of the value in the array to the first key.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for dynamically adjusting node sizes in a multiway trie data structure, the method comprising:
    doubling a width of a node in a multiway trie data structure, by a processor, to be resized in a resized multiway trie data structure in response to a key-value pair being inserted in a slot of said node in said multiway trie data structure, wherein said insertion of said key-value pair causes a number of entries in said multiway trie data structure to exceed a threshold; and
    expanding a depth of said node in said multiway trie data structure, by said processor, to be resized in said resized multiway trie data structure with a depth equal to log2 (width of said resized node).

2. The method as recited in claim 1 further comprising:
    storing a value in a first half of a sub-node located at slot (i) of said node in said multiway trie data structure at slot (2*i) of said resized node in said resized multiway trie data structure in a first child level node, wherein i is a loop counter and is less than a width of said node in said multiway trie data structure; and
    storing a value in a second half of said sub-node located at slot (i) of said node in said multiway trie data structure at slot (2*i+1) of said resized node in said resized multiway trie data structure in a second child level node.

3. The method as recited in claim 1 further comprising:
    extracting a bit value of a key of a key-value pair in response to said key-value pair being stored in slot (i) of said node in said multiway trie data structure, wherein i is a loop counter and is less than said width of said node in said multiway trie data structure;
    storing said key-value pair at slot (2*i) of said resized node in said resized multiway trie data structure if said bit value equals 0; and
    storing said key-value pair at slot (2*i+1) of said resized node in said resized multiway trie data structure if said bit value does not equal 0.

4. The method as recited in claim 1 further comprising:
    storing a value at index 0 in a sub-node of said node in said multiway trie data structure at slot (2*i) of said resized node in said resized multiway trie data structure in response to slot (i) of said node in said multiway trie data structure containing said sub-node of width of 2, wherein i is a loop counter and is less than said width of said node in said multiway trie data structure; and
    storing a value at index 1 in said sub-node of said node in said multiway trie data structure at slot (2*i+1) of said resized node in said resized multiway trie data structure in response to slot (i) of said node in said multiway trie data structure containing said sub-node of width of 2.

5. The method as recited in claim 1 further comprising:
    initializing a loop counter i to equal zero; and
    incrementing said loop counter i by one in response to slot(i) of said node in said multiway trie data structure being null.

6. The method as recited in claim 5 further comprising:
    garbage collecting said multiway trie data structure in response to said loop counter i being not less than said width of said node in said multiway trie data structure.

7. The method as recited in claim 1 further comprising:
    inserting said key-value pair in said slot of said node in said multiway trie data structure in response to said slot of said node in said multiway trie data structure containing a null.

8. The method as recited in claim 1 further comprising:
    creating a node in a next lower level in said multiway trie data structure in response to said slot of said node in said multiway trie data structure containing a leaf;
    inserting a second key-value pair stored in said leaf in said created node; and
    replacing said second key-value pair stored in said leaf in said slot of said node in said multiway trie data structure with said created node.

9. A computer program product embodied in a computer readable storage medium for dynamically adjusting node sizes in a multiway trie data structure, the computer program product comprising the programming instructions for:
    doubling a width of a node in a multiway trie data structure, by a processor, to be resized in a resized multiway trie data structure in response to a key-value pair being inserted in a slot of said node in said multiway trie data structure, wherein said insertion of said key-value pair causes a number of entries in said multiway trie data structure to exceed a threshold; and
    expanding a depth of said node in said multiway trie data structure, by said processor, to be resized in said resized multiway trie data structure with a depth equal to log2 (width of said resized node).

10. The computer program product as recited in claim 9 further comprising the programming instructions for:
    storing a value in a first half of a sub-node located at slot (i) of said node in said multiway trie data structure at slot (2*i) of said resized node in said resized multiway trie data structure in a first child level node, wherein i is a loop counter and is less than a width of said node in said multiway trie data structure; and
    storing a value in a second half of said sub-node located at slot (i) of said node in said multiway trie data structure at slot (2*i+1) of said resized node in said resized multiway trie data structure in a second child level node.

11. The computer program product as recited in claim 9 further comprising the programming instructions for:
    extracting a bit value of a key of a key-value pair in response to said key-value pair being stored in slot (i) of said node in said multiway trie data structure, wherein i is a loop counter and is less than said width of said node in said multiway trie data structure;
    storing said key-value pair at slot (2*i) of said resized node in said resized multiway trie data structure if said bit value equals 0; and
    storing said key-value pair at slot (2*i+1) of said resized node in said resized multiway trie data structure if said bit value does not equal 0.

12. The computer program product as recited in claim 9 further comprising the programming instructions for:
   storing a value at index 0 in a sub-node of said node in said multiway trie data structure at slot (2*i) of said resized node in said resized multiway trie data structure in response to slot (i) of said node in said multiway trie data structure containing said sub-node of width of 2, wherein i is a loop counter and is less than said width of said node in said multiway trie data structure; and
   storing a value at index 1 in said sub-node of said node in said multiway trie data structure at slot (2*i+1) of said resized node in said resized multiway trie data structure in response to slot (i) of said node in said multiway trie data structure containing said sub-node of width of 2.

13. The computer program product as recited in claim 9 further comprising the programming instructions for:
   initializing a loop counter i to equal zero; and
   incrementing said loop counter i by one in response to slot(i) of said node in said multiway trie data structure being null.

14. The computer program product as recited in claim 13 further comprising the programming instructions for:
   garbage collecting said multiway trie data structure in response to said loop counter i being not less than said width of said node in said multiway trie data structure.

15. The computer program product as recited in claim 9 further comprising the programming instructions for:
   inserting said key-value pair in said slot of said node in said multiway trie data structure in response to said slot of said node in said multiway trie data structure containing a null.

16. The computer program product as recited in claim 9 further comprising the programming instructions for:
   creating a node in a next lower level in said multiway trie data structure in response to said slot of said node in said multiway trie data structure containing a leaf;
   inserting a second key-value pair stored in said leaf in said created node; and
   replacing said second key-value pair stored in said leaf in said slot of said node in said multiway trie data structure with said created node.

17. A system, comprising:
   a memory unit for storing a computer program for dynamically adjusting node sizes in a multiway trie data structure; and
   a processor coupled to said memory unit, wherein said processor, responsive to said computer program, comprises:
      circuitry for doubling a width of a node in a multiway trie data structure, by a processor, to be resized in a resized multiway trie data structure in response to a key-value pair being inserted in a slot of said node in said multiway trie data structure, wherein said insertion of said key-value pair causes a number of entries in said multiway trie data structure to exceed a threshold; and
      circuitry for expanding a depth of said node in said multiway trie data structure, by said processor, to be resized in said resized multiway trie data structure with a depth equal to log2 (width of said resized node).

18. The system as recited in claim 17, wherein said processor further comprises:
   circuitry for storing a value in a first half of a sub-node located at slot (i) of said node in said multiway trie data structure at slot (2*i) of said resized node in said resized multiway trie data structure in a first child level node, wherein i is a loop counter and is less than a width of said node in said multiway trie data structure; and
   circuitry for storing a value in a second half of said sub-node located at slot (i) of said node in said multiway trie data structure at slot (2*i+1) of said resized node in said resized multiway trie data structure in a second child level node.

19. The system as recited in claim 17, wherein said processor further comprises:
   circuitry for extracting a bit value of a key of a key-value pair in response to said key-value pair being stored in slot (i) of said node in said multiway the data structure, wherein i is a loop counter and is less than said width of said node in said multiway trie data structure;
   circuitry for storing said key-value pair at slot (2*i) of said resized node in said resized multiway trie data structure if said bit value equals 0; and
   circuitry for storing said key/value key-value pair at slot (2*i+1) of said resized node in said resized multiway tie data structure if said bit value does not equal 0.

20. The system as recited in claim 17, wherein said processor further comprises:
   circuitry for storing a value at index 0 in a sub-node of said node in said multiway trie data structure at slot (2*i) of said resized node in said resized multiway trie data structure in response to slot (i) of said node in said multiway trie data structure containing said sub-node of width of 2, wherein i is a loop counter and is less than said width of said node in said multiway trie data structure; and
   circuitry for storing a value at index 1 in said sub-node of said node in said multiway trie data structure at slot (2*i+1) of said resized node in said resized multiway trie data structure in response to slot (i) of said node in said multiway trie data structure containing said sub-node of width of 2.

21. The system as recited in claim 17, wherein said processor further comprises:
   circuitry for initializing a loop counter i to equal zero; and
   circuitry for incrementing said loop counter i by one in response to slot(i) of said node in said multiway trie data structure being null.

22. The system as recited in claim 21, wherein said processor further comprises:
   circuitry for garbage collecting said multiway trie data structure in response to said loop counter i being not less than said width of said node in said multiway trie data structure.

23. The system as recited in claim 17, wherein said processor further comprises:
   circuitry for inserting said key-value pair in said slot of said node in said multiway trie data structure in response to said slot of said node in said multiway trie data structure containing a null.

24. The system as recited in claim 17, wherein said processor further comprises:
   circuitry for creating a node in a next lower level in said multiway trie data structure in response to said slot of said node in said multiway trie data structure containing a leaf;
   circuitry for inserting a second key-value pair stored in said leaf in said created node; and
   circuitry for replacing said second key-value pair stored in said leaf in said slot of said node in said multiway trie data structure with said created node.

* * * * *